United States Patent
Li et al.

(10) Patent No.: US 7,493,521 B1
(45) Date of Patent: Feb. 17, 2009

(54) APPARATUS AND METHOD FOR ESTIMATING THE TESTING PROFICIENCY OF A SOFTWARE TEST ACCORDING TO EMS MESSAGES EXTRACTED FROM A CODE BASE

(75) Inventors: Ka-Yau Li, Milpitas, CA (US); Michael Baikie, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 473 days.

(21) Appl. No.: 11/166,525

(22) Filed: Jun. 23, 2005

(51) Int. Cl.
*G06F 11/00* (2006.01)
(52) U.S. Cl. .......................... 714/38; 717/124
(58) Field of Classification Search .............. 714/38; 717/124
See application file for complete search history.

(56) References Cited

U.S. PATENT DOCUMENTS

| | | | |
|---|---|---|---|
| 5,805,795 A * | 9/1998 | Whitten ........................ | 714/38 |
| 6,212,675 B1 * | 4/2001 | Johnston et al. ............. | 717/107 |
| 6,959,431 B1 * | 10/2005 | Shiels et al. ................. | 717/124 |
| 2002/0010879 A1 * | 1/2002 | Chen ............................ | 714/38 |
| 2004/0025088 A1 * | 2/2004 | Avvari et al. ................. | 714/38 |
| 2006/0195724 A1 * | 8/2006 | Filho ............................ | 714/35 |

\* cited by examiner

*Primary Examiner*—Robert Beausoilel
*Assistant Examiner*—Charles Ehne
(74) *Attorney, Agent, or Firm*—Perkins Coie LLP

(57) ABSTRACT

An apparatus and method for estimating the proficiency of a software test according to EMS messages extracted from a code base. Embodiments of the invention are generally directed to providing some measurement of the proficiency of a test script for testing a software application. In one embodiment, data is collected on event messages generated during a test of a software application to form event message statistics. In one embodiment, a measurement is computed to identify an amount or percentage of software application code tested during the test script. A code base of the software application may include a central repository having a substantial portion of the event messages that may be issued by the software application in response to error conditions. In one embodiment, these event messages are taken from the central repository and stored within a database. Other embodiments are described and claimed.

17 Claims, 11 Drawing Sheets

| EMS ID 222 | MESSAGE BODY 224 | SOFTWARE COMPONENT DESCRIPTION 226 | MESSAGE TYPE 228 | MESSAGE TYPE TOTAL 229 |
|---|---|---|---|---|
| • | • | • | • | • |
| • | • | • | • | • |
| • | • | • | • | • |
| • | • | • | • | • |
| • | • | • | • | • |

| 222 | 224 | 226 | 228 | 229 | 252 | 254 | 256 |
|---|---|---|---|---|---|---|---|
| EMS ID | MESSAGE BODY | SOFTWARE COMPONENT DESCRIPTION | MESSAGE TYPE | MESSAGE TYPE TOTAL | TEST STATE | TEST STRIPT TEST CASE | TIME STAMP |
| • | • | • | • | • | • | • | • |
| • | • | • | • | • | • | • | • |
| • | • | • | • | • | • | • | • |
| • | • | • | • | • | • | • | • |
| • | • | • | • | • | • | • | • |

APPARATUS AND METHOD FOR ESTIMATING THE TESTING PROFICIENCY OF A SOFTWARE TEST ACCORDING TO EMS MESSAGES EXTRACTED FROM A CODE BASE

FIELD OF THE INVENTION

One or more embodiments relate generally to the field of software application testing. More particularly, an exemplary embodiment relates to a method and apparatus for estimating the testing proficiency of a software test according to event message system (EMS) event messages extracted from a code base.

BACKGROUND

Software manufacturers are engaged in a constant race to bring their software applications to market. The burden to outdo the competition, by providing a product that captures a substantial portion of the market share, bounces back and forth between the various software manufacturers. This fierce competition is further exacerbated by the continuous demand for software applications that support entertainment-based subject matter, media applications, as well as computationally-intensive applications. As a result, the time available to a software manufacturer to bring a new software application to market is steadily decreasing.

As a result, software manufacturers place a significant amount of effort in quality assurance (QA) testing of a product prior to a first customer shipment. Generally, a QA team works with the software developers to identify testing areas for generating as many test cases as possible, with the goal of testing the entire product. One test generated from such test cases is a negative test. As described herein, "a negative test" refers to a test designed to test product behavior in response to error conditions applied to the executing software application code. Unfortunately, the amount of errors or bugs within software application code increases according to a logarithmic scale as a length of the code increases. As a result, it is generally not possible to ensure that software application code is one hundred percent (100%) tested.

A QA team that gives into the pressure to place a software application in the stream of commerce may inadequately test the software product. As a result, consumers of the software product may be dissatisfied with the product due to an unduly amount of errors encountered during usage of the software product. Conversely, QA teams that spend undue amounts of time testing a software application run the risk of failing to capture a portion of the market share by delaying first customer shipments of a product.

Generally, QA teams lack the capability to provide some measurement of how thoroughly an application has been tested. Without such a measurement, QA teams run the risk of either performing inadequate testing of a software application, which eventually results in consumer dissatisfaction with the product due to an undue amount of errors. Conversely, it is possible to go overboard with the testing of a software application, which generally results in a substantial delay in bringing the software application to market.

Furthermore, the complexity of such applications is not diminishing but, in fact, continues to grow as developers attempt to comply with requests or desires to add additional features to such software applications. For example, software applications having four to five million lines to code and multi-layer software applications having hundreds of different layers are not uncommon. As a result, it is nearly impossible to provide a comprehensive test script to test the entirety of such complex software applications to provide some assurance that each module, component or feature of such software is adequately tested.

As a result, in today's modern development environment, the problem of testing complex software applications is often subdivided, such that different components, modules or features are separately tested by the members of a QA or other product testing team. Accordingly, even assuming that the various members of the QA or product testing team adequately test each module, feature or function separately, there is no assurance than the entirety of the product is being tested to provide sufficient quality assurance to enable a first customer shipment. Hence, in this modern development environment, the lack of some capability to provide some measurement of how thoroughly a software application has been tested is exacerbated by the piecemeal testing of the various modules, components or functions of a complex software application.

SUMMARY OF THE INVENTION

Embodiments of the invention are generally directed to providing some measurement of the ability of a test for testing the entirety of a software application or a desired portion of the software application, referred to herein as a "testing proficiency." In one embodiment, data is collected on even messages generated during a test of a software application to form event message data. Once such event message data is captured, in one embodiment, a testing proficiency value is assigned to the test according to a testing percentage value based on a count of event messaged issued during the test divided by a total event message count of software application code.

In one embodiment, a code base of the software application includes a central repository having a substantial portion of the event messages that may be issued by the software application. In one embodiment, these event messages are taken from the central repository and stored within a database. Accordingly, assuming above-average testing proficiency values or other like metric are determined from each of the tests of the software application, testing of the software application or component may be completed with sufficient quality assurance of the software application code for issuance of a first customer shipment of the software application.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 is a diagram illustrating an EMS event message file, in accordance with one embodiment.

FIG. 5 is a block diagram illustrating EMS event message data, in accordance with one embodiment.

DETAILED DESCRIPTION

An apparatus and method for estimating the testing proficiency of a software test according to event message system (EMS) event messages extracted from a code base are described. As described herein, the phrase "testing proficiency value" refers to some measurement including, but not limited, a percentage, numeric value or other like graded value to determine how thoroughly a testing using, for example, a test script, is testing a software application. In one embodiment, a "test percentage" is based on a count of event messages issued a software application during a test divided by the total number of event messages of software application code. In the embodiments described, calculation of the "testing percentage" is based on the collection of event message data regarding the event message generated by the software application during the test.

In the embodiments described below, it is assumed that bugs detected as part of a software test are corrected by the software developers. However, without some metric for determining the testing proficiency of the software test and assigning a testing proficiency value to the software test (how thoroughly the software test has tested the software application), the software developers may not have sufficient satisfaction that testing of the software application or component is complete. Accordingly, in the embodiments described, the software tests may be evaluated and assigned a testing proficiency value, including but not limited to, some grade or other metric based on how thoroughly the software test has subjected a software application to test conditions.

As described below, the testing proficiency value may be based on a testing percentage. In one embodiment, the testing percentage may be a measurement based on an invoked event message count divided by a total event message count of the software application code or other like measure. In one embodiment, this testing percentage is based on "software application code information" including, but not limited to, the total number of event messages of the software application code, event message types, even message type totals or other like information.

Accordingly, assuming above-average testing proficiency values or other like metric are determined for each test of the software application, testing of the software application or component may be completed with sufficient quality assurance (QA) of the software application for issuance of a first customer shipment of the software application. Conversely, below average testing proficiency value may require modification of software test as well as a test plan for providing QA of the software.

Figure 11:
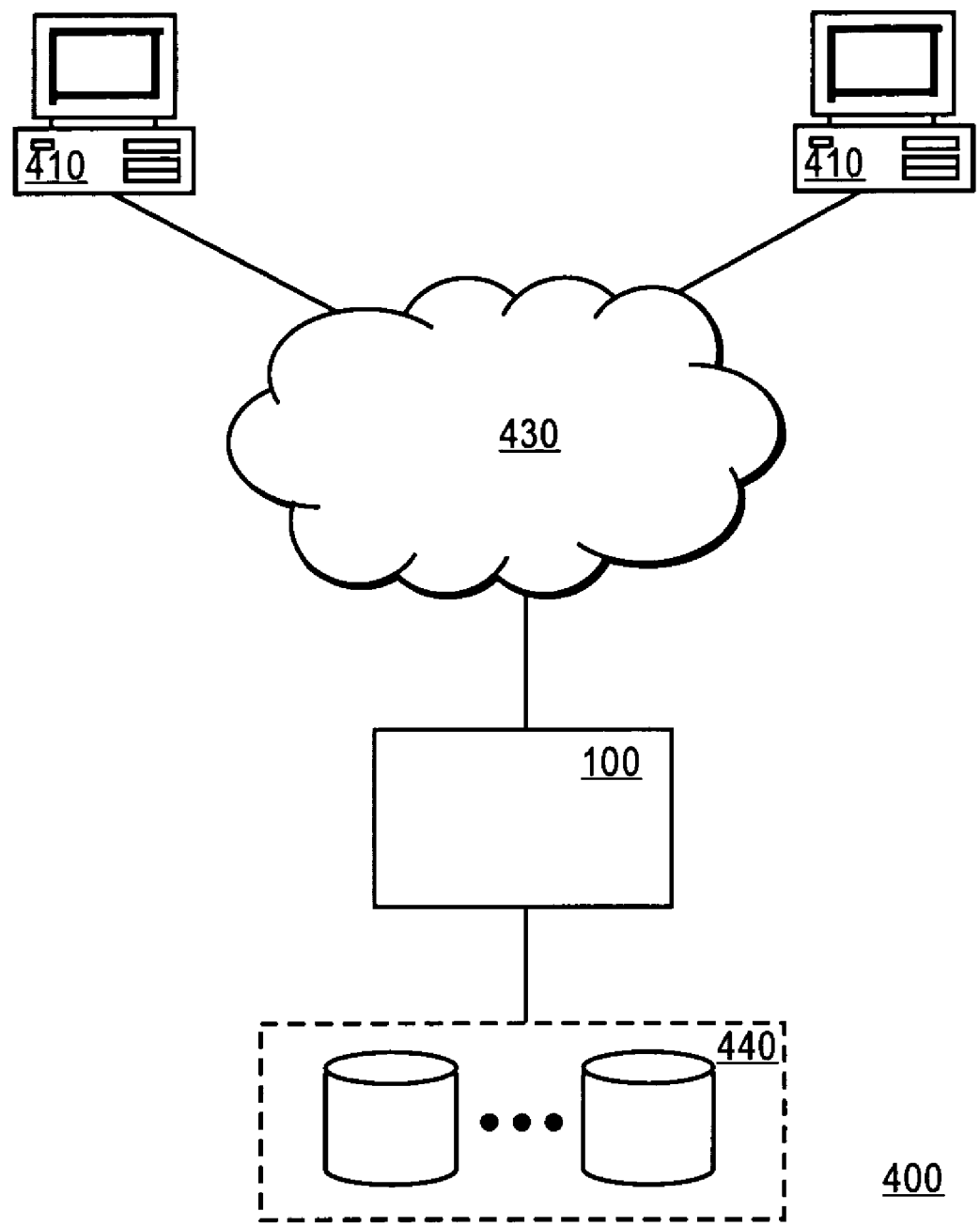
FIG. 11 shows a network environment that includes the storage server of FIG. 1, which implements the invention.

As described herein, the techniques for estimating the testing proficiency of a software test can be implemented to test software application code within a storage server, for example, as shown in FIG. 11. However, the techniques for estimating the testing proficiency of a software test introduced herein are not limited to software executed within storage servers and may be used to estimate the proficiency of any software application that generates a response to detected error conditions.

Figure 1:
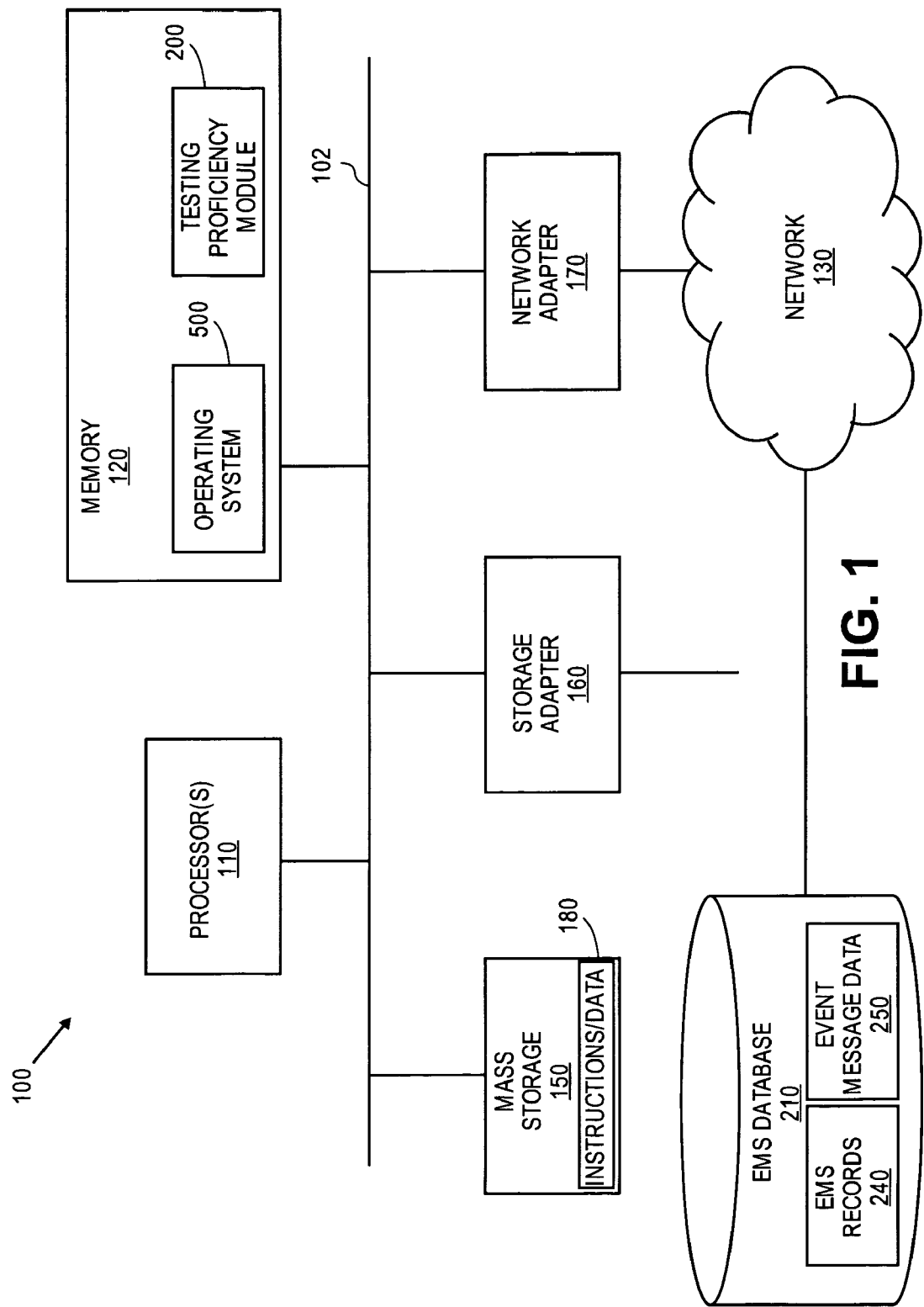
FIG. 1 is a block diagram showing an architecture of an apparatus that can implement one embodiment of the invention.

FIG. 1 is a block diagram showing the architecture of an apparatus 100 that may function as a storage server (see FIG. 11), according to certain embodiments of the invention. Certain standard and well-known components which are not germane to the present invention may not be shown. Apparatus 100 includes one or more processors 110 and memory 120 coupled to a system interconnect 102. Also connected to processors 110 through the system interconnect 130 are one or more internal mass storage devices 150, a storage adapter 160, and a network adapter 170.

Memory 120 is or includes the main memory of storage server 100. Memory 120 represents any form of random access memory (RAM), read-only memory (ROM), flash memory, or the like, or a combination of such devices. Memory 120 stores, among other things, operating system 500 of apparatus 100, in which may be subject to a test. In one embodiment, testing proficiency module 200 assigns a testing proficiency value to a software test of a software application or component, according to one embodiment.

Internal mass storage devices 150 may be or include any conventional medium for storing large volumes of data in a non-volatile manner, such as one or more magnetic or optical based disks. The storage adapter 160 allows apparatus 100 to access storage subsystem 440 (shown in FIG. 11) and may be, for example, a Fibre Channel adapter or a Small Computer System Interface (SCSI) adapter. Network adapter 170 provides apparatus 100 with the ability to communicate with remote devices, such as the clients 410 (shown in FIG. 11), over network 130 and may be, for example, an Ethernet adapter.

As illustrated in FIG. 1, in one embodiment, network adapter 170 enables communication with an event message system (EMS) database (DB) 210, via network 130, which includes EMS event message data 250. In the embodiments described below, testing proficiency module 200 includes event message collection module 260 to generate database records (event message data 250) within EMS DB 210 for each event message generated by a software application 190 during a software test. In one embodiment, the software test is performed using a test script, which includes a plurality of test cases that may be comprised of a set of data test programs and expected results.

As described herein, the term "event message" refers to any text message issued by a software application to other software modules, the OS, a system administrator, user or the like, such as text message issued in response to detected test conditions, for example an error condition caused by a negative test. In one embodiment, message collection module 260 collects data within EMS DB 210 for each event message issued by a software application during a test of the software application. As described herein, "tracking of the event messages" is based on event message records contained within EMS DB 210, as described in further detail below.

As described below, a code base of the software application may include a file that lists event messages that may be issued by the software application. In one embodiment, this file is referred to as an "event message system" (EMS) file, which is generated, for example, by software programmers during coding of the software application to provide a central repository for event messages that may be issued by the software application. Accordingly, in the embodiments described, "estimating the testing proficiency of a software test" may include issuance of a testing proficiency value to the software test based on a testing percentage of the number of event messages invoked by the test divided by the total number of event messages of the software application, or other like measure.

Referring again to FIG. 1, System interconnect 130 shown in FIG. 1 is an abstraction that represents any one more separate physical buses and/or point-to-point connections, connected by appropriate bridges, adapters and/or controllers. System interconnect 130, therefore, may include, for example, a system bus, a Peripheral Component Interconnect (PCI) bus, a HyperTransport or industry standard architecture (ISA) bus, a smaller computer system interface (SCSI) bus, a universal serial bus (USB), or an Institute of Electrical and Electronics Engineers (IEEE) standard 1394 bus (sometimes referred to as "Firewire").

Processors 110 are the central processing units (CPUs) of a storage server (e.g., storage sever 100, shown in FIGS. 1 and 11) and, thus, control the overall operation of the storage server. In certain embodiments, processors 110 accomplish this by executing software stored in memory 120, in which may be subject to a test. In one embodiment, error collection module 260 estimates the proficiency of a software test to implement the techniques introduced above. Processor 110 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Figure 2:
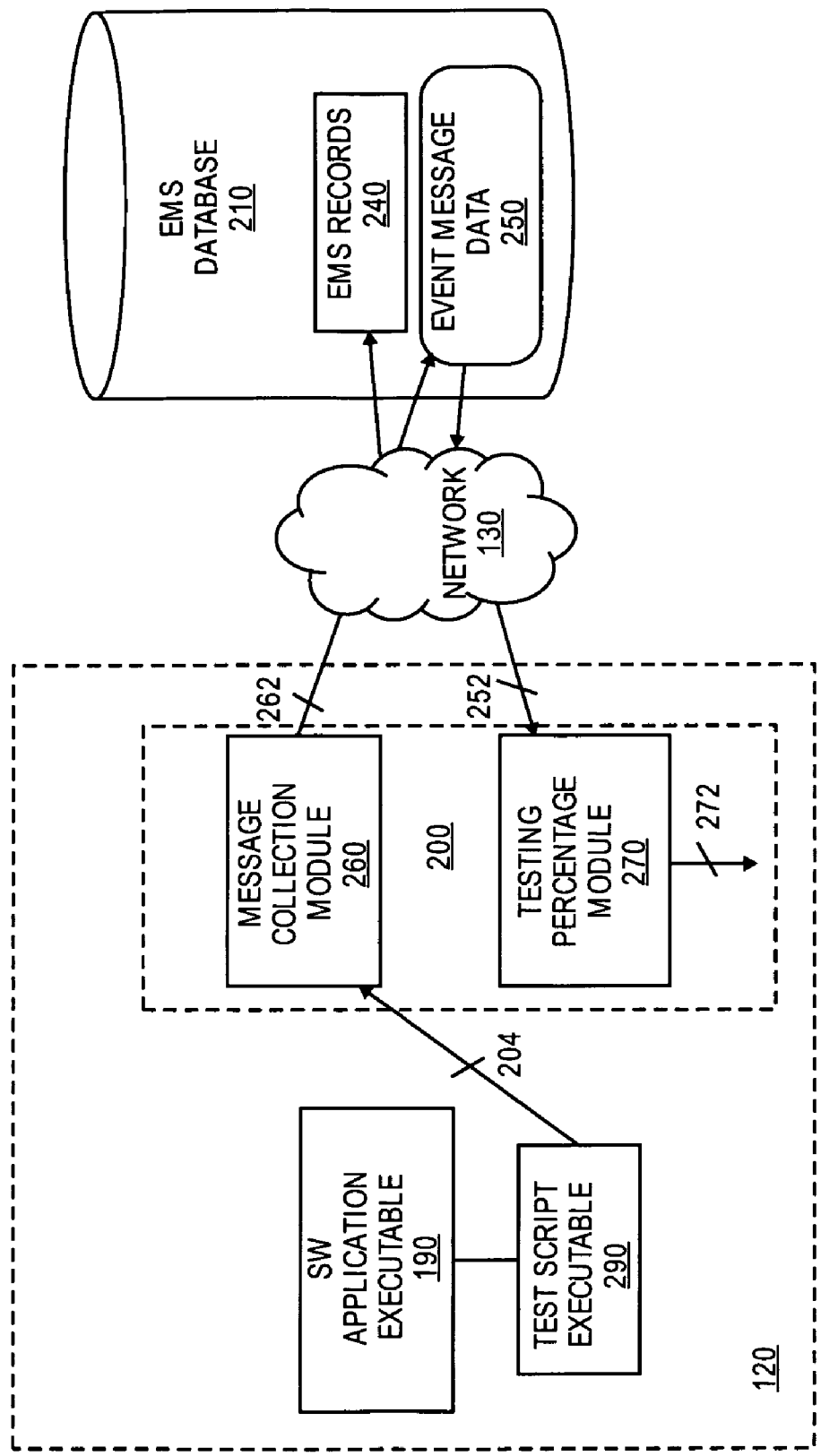
FIG. 2 is a block diagram illustrating the collection of data regarding event messages generated during a test of the software application, in accordance with one embodiment.

FIG. 2 is a block diagram illustrating testing proficiency module 200 for estimating the testing proficiency of a software test executable 290 according to EMS event messages extracted from a code base, in accordance with one embodiment. Representatively, memory 120 of apparatus 100, as shown in FIG. 1, is loaded with a software test (test script executable) 290, testing proficiency module 200 and a software application executable 190. However, in the embodiments described, testing proficiency module 200, test script 290 and application executable 190 may run on a separate machines from apparatus 100.

In one embodiment, testing proficiency module 200 includes a message collection module 260 and testing percentage module 270. As shown, the message collection module 260, in combination with the testing percentage module 270, enable testing proficiency module to module 200 estimate a testing proficiency of test script executable 290 to provide, issue or assign some measurement 272 (e.g., letter grade) of the testing proficiency of software test (test script executable) 290 in testing software application 190.

As described herein, test script 290 may be a testing work product modeling a software program (often written in a procedural scripting language, e.g., Pearl) that executes a test suite of test cases to be applied to software application 190 to, for example, verify the functionality of software application 190 prior to a first customer shipment. In one embodiment, test script 290 issues invalid input to software application 202 to test the software application's error handling capability. As described herein, the use of invalid input to test a program's error handling is referred to as a "negative test." In one embodiment, message collection module 260 generates a database records (event message data) 250 within EMS DB 210 for each event message 204 generated by software application 190 in response to test script 292. Although described with reference to a negative test, test script 290 may be generated to provide an acceptance test, a functional test, a regression test, or other like test.

In one embodiment, EMS database 210 includes EMS records 240, which are further illustrated in FIGS. 4 and 5. Referring again to FIG. 2, for each event message 204 issued by software application 190 in response to test script 292, message collection module 260 may find a matching event message within EMS DB 210 and record data 262 regarding the event message 204 to form event message data 250 within EMS database 210. In one embodiment, formation or forming of the EMS event message data 250 may include, for example, a count of each event message 204 issued by software application 202, which matches an EMS event message contained within EMS DB 210.

Representatively, testing proficiency module 270 processes records 252 from event message data 250 to provide a measure or testing proficiency value 272 of the software test 290 according to a testing percentage based on an amount of event messages issued by software application executable 190 tested by test script 292 (divided by a total amount event messages of software application code). Based on such information, in one embodiment, testing proficiency module 270 generates a testing proficiency value 272 for test script 290. As indicated above, in one embodiment, the testing proficiency value may include, for example, a percentage of the event messages within EMS DB that match an event message issued by software application 190 in response to test script 292 divided by a total number of event messages.

Figure 3:
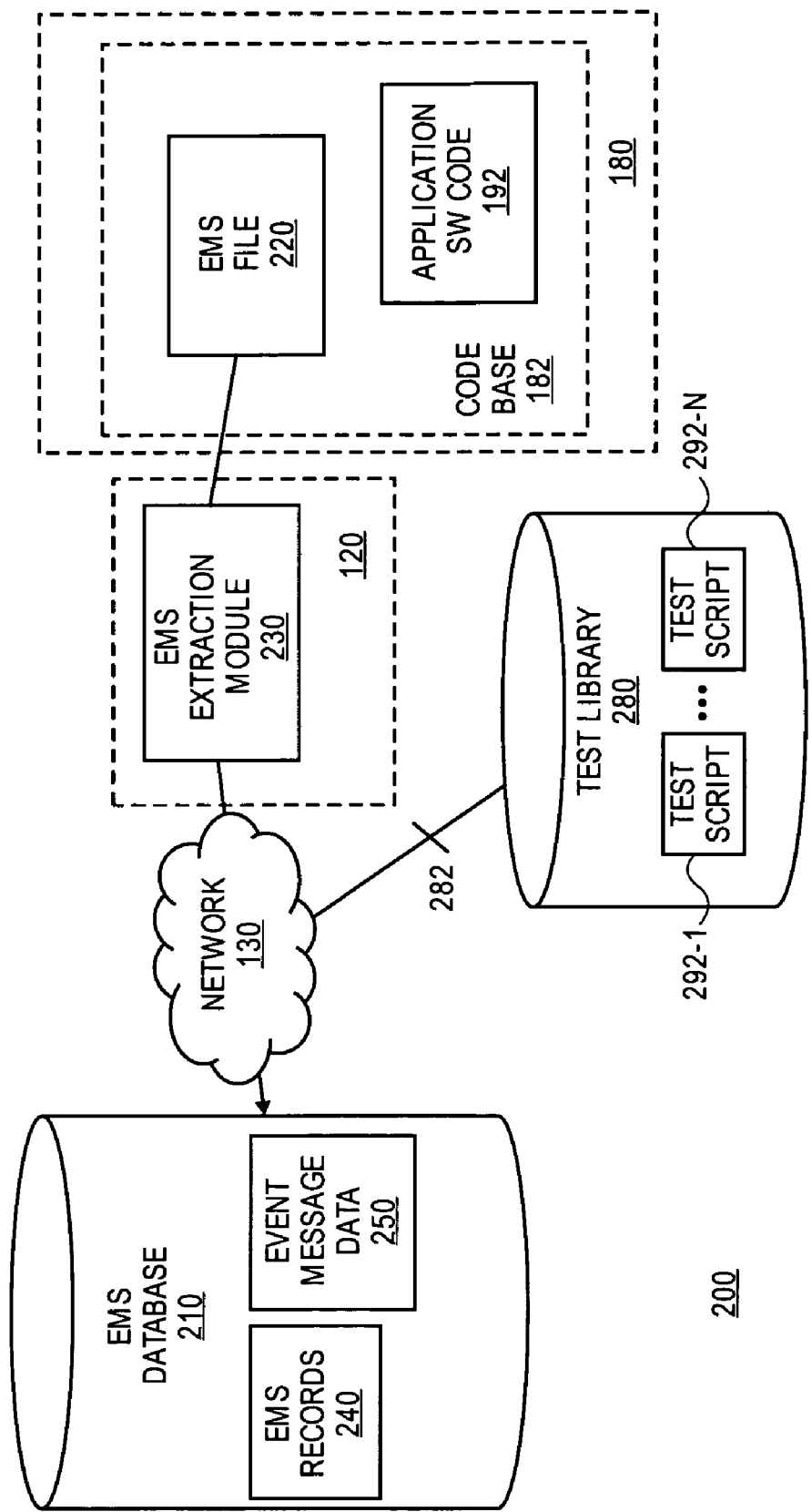
FIG. 3 is a block diagram illustrating extraction of event message system (EMS) event messages from a code base and populating a database with the extracted EMS event messages, in accordance with one embodiment.

In an alternative embodiment where various test scripts are used to individually test various components, functions or features of the software application, software application code information, for example contained within an EMS event message file 220, as shown in FIG. 3, may provide, for example, various message types, as well as a count of the various messages of the various messages types. For examples, referring to FIG. 12, software application code information may include event messages issued by file system layer 510, event messages issued by storage access layer 540, event messages issued by storage drivers layer 550, event messages issued by network access layer 540 event messages issued by protocol layer 520 and a count of the total event message of each respective software layer.

In accordance with such embodiments, for example, a QA team may separately test a storage access layer 540 and determine an amount of event messages issued by the storage access layer. Once determined, this count can be compared to a total amount of storage access layer type messages to determine the testing proficiency of the software test for testing the storage access layer. As described herein, this process may be repeated for the various layers of software application code, such as, for example, an operating system of apparatus 100, as shown in FIG. 1.

Figure 12:
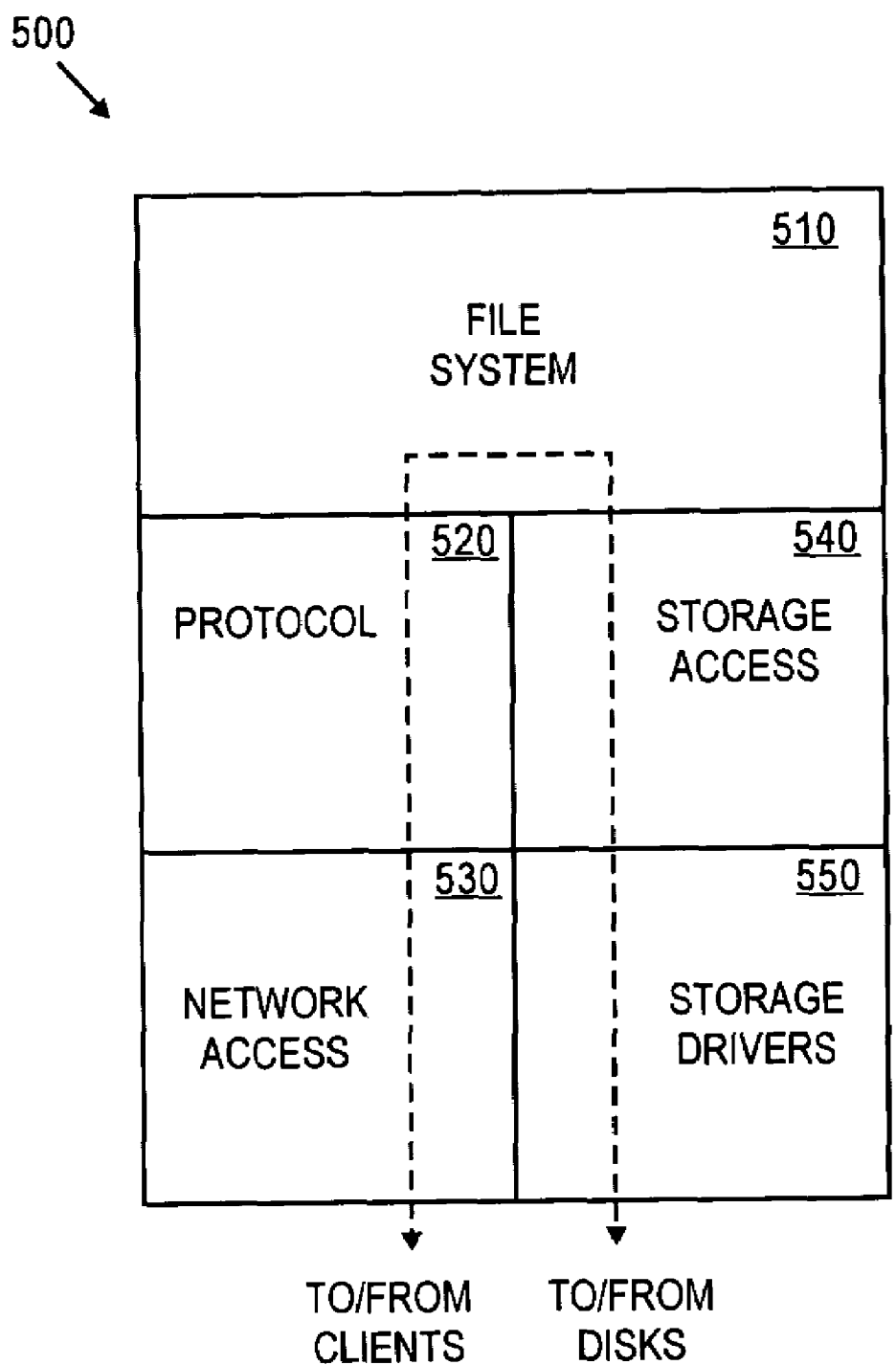
FIG. 12 is a block diagram illustrating selected aspects of the logical architecture of a storage system; according to an embodiment of the invention.

In one embodiment, the event message data 250 may be processed by testing proficiency module 200 to provide an event message report to illustrate the coverage of the various test scripts in testing the various layers of a software application code. In one embodiment, the event message report could be based on event messages issued by file system layer 510, event messages issued by storage access layer 540, event messages issued by storage drivers layer 550, event messages issued by network access layer 530 event messages issued by protocol layer 520 and a count of the total event message of each respective software layer, as shown in FIG. 12. Using such information, a QA team may be able to determine overlap between the various tests of components; or when a lack of overlap is detected, the QA team can further broaden the testing provided by such test scripts 292 (FIG. 3) to provide sufficient testing coverage of a software application to enable a first customer shipment.

FIG. 3 is a block diagram illustrating an EMS extraction module 230, in accordance with one embodiment. Representatively, EMS extraction module 230 searches a code base 210 to detect EMS event message file 220. As indicated above, EMS event message file 220 provides a central repository for developers of software application code 192 to store event message 204 that may be issued by software application code 192. In one embodiment, EMS event message file 220 may include "software application code information" as described above. Once such file is located, EMS extraction module 230 generates event message EMS records 240. In one embodiment, EMS records 240 include a unique database record for each event message 204 contained with an EMS event message file 220, by assigning a unique numeric identifier to each message to enable storage within a relational database (e.g., EMS database 210).

In one embodiment, EMS event message file 220 is shown in FIG. 4. As shown in FIG. 4, EMS event message file 220 may include a unique, numeric identification value (EMS ID) 222, a body of the message 224, software component description 226, message type 228 and message type total 229. In one embodiment, software component description 226 includes, but is not limited to a software module of software application code 192 containing the event message 204, an application layer, function, or other like subdivision of software application code 192 (FIG. 3). In the embodiments described, it is assumed that the software modules of a software application do not include identical event messages. Accordingly, in the embodiments described, the event messages for each module of the software application are unique. In an alternative embodiment, the software modules of the application may include matching event messages. Accordingly, in such embodiments, records within the EMS records 240 generated by EMS extraction module 230 are unique according to the combination of EMS ID field 222, message body field 224 and the system information field 226, as shown in FIG. 4.

Referring again to FIG. 2, messages collection module 260 uses EMS records 240 to find a matching EMS record for each detected EMS event message 204 issued by software application 190 in response to test script 290. As shown, data 262 regarding such event messages 204 is recorded within EMS DB 210 to form event message data 250. In one embodiment, event message data 250 is shown in FIG. 5. Representatively, EMS event message data 250 may include a database table containing components of EMS event message file 220 in addition to column 252 indicating a test state captured when the event message 204 was issued, test script test case column 254, which indicates a test script that caused the event message and a time stamp column 256 indicating a date and time when the event message was issued. As described herein, the test state includes, but is not limited to a test script name, a test type, a test description, a software version number, a hardware configuration, and the like.

Although illustrated to include columns 222, 224, 226, 228, 229, 252, 254 and 256, it should be recognized that event message data 250 may include further columns, such as a count column for each event message to indicate an amount of times the respective event message was issued by the software application in response to the test script. In one embodiment, a count column is provided as column 252 of event message data 250. In an alternative embodiment, message collection module 260 may simply generate a record for each event message generated by the software application in response to the test script. Such information would then be further processed, for example, to determine a count of each event message of an event message type is issued by the software application in response to the test script, which is compared to a total message count of the event message type. In one embodiment, such processing is performed by testing proficiency module 270, as shown in FIG. 2.

Referring again to FIG. 3, mass storage 150 includes test library 280, which includes a plurality of test scripts 292 (292-1, ..., 292-N). Although illustrated to include a plurality of test scripts 292, test library 280 may be limited to a single test script or the plurality to test scripts as shown. In the embodiments described, the test scripts 292 may be negative tests or other like tests to determine whether a software application is ready for a first customer shipment. Accordingly, assuming above-average testing proficiency values or other like metric are determined for each test of the software application, testing of the software application or component may be completed with sufficient QA of the software application for issuance of a first customer shipment of the software application. In the embodiments described, software application 202 is, for example, operating system 500 of storage 100, as illustrated in FIGS. 1 and 11.

Although described with reference to a storage server, as illustrated with reference to FIG. 11, the techniques described herein for estimating the proficiency of a software test may be applied to virtually any software application that issues event messages. In one embodiment, application of such techniques requires software developers to provide the central repository to contain each event message of the software application including software application code information. In alternative embodiments, a script may be generated, for example, to scan software application to determine the various event messages generated by the software application code in response to error conditions, as well as the software application code information. Procedural methods for implementing embodiments described above are not provided.

Operation

Figure 6:
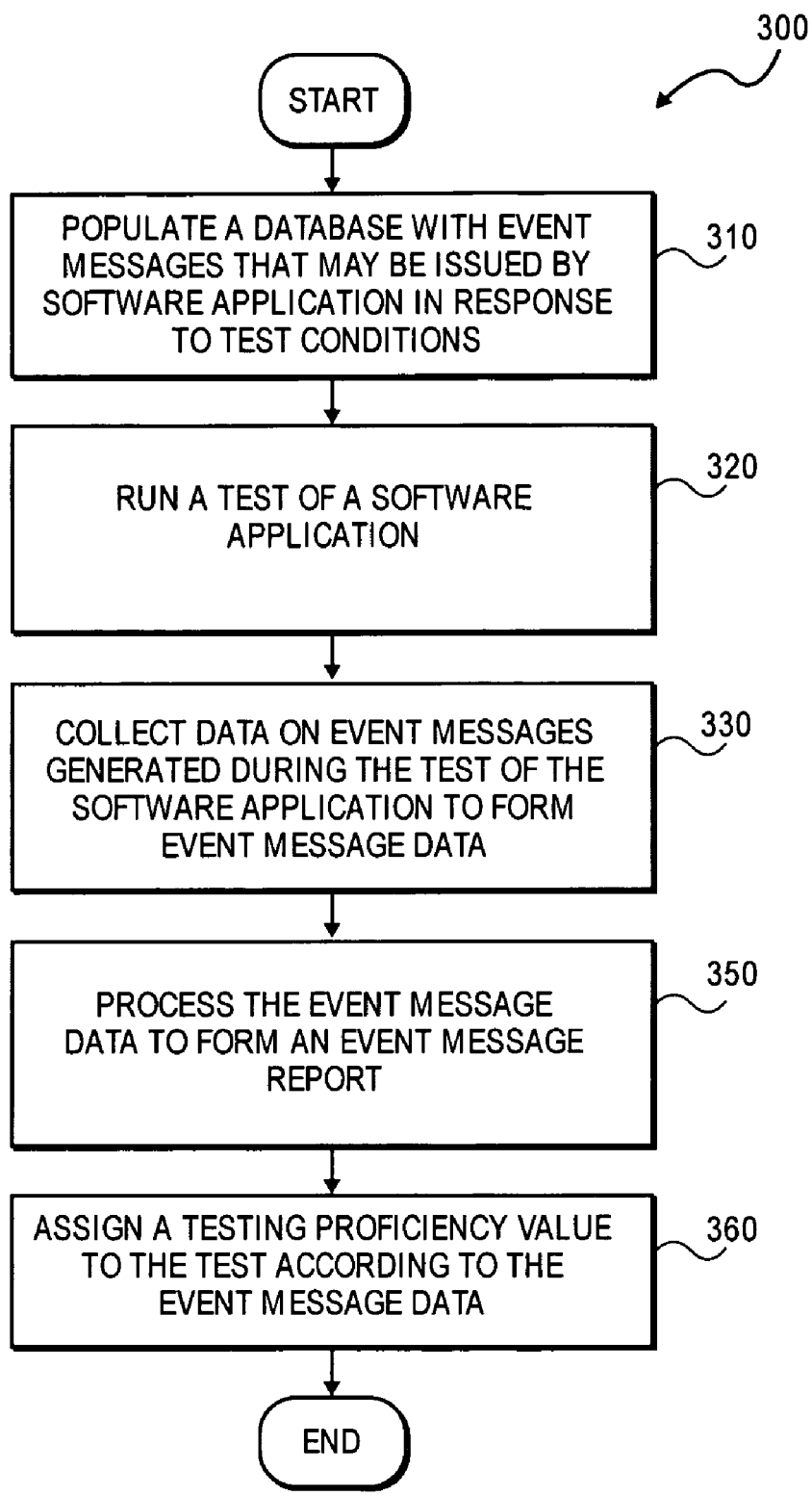
FIG. 6 is a flowchart illustrating a method for estimating a testing proficiency of a test of a software application according to event messages generated during the test of the software application, in accordance with one embodiment.

Turning now to FIG. 6, the particular methods associated with embodiments of the invention are described in terms of computer software and hardware with reference to a flowchart. The methods to be performed by a computing device (e.g., a storage) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flowchart illustrating a method 300 for estimating the testing proficiency of a software test according to event message system (EMS) event messages extracted from a code base, in accordance with one embodiment. In the embodiments described, examples of the described embodiments will be made with reference to FIGS. 1-5, 11 and 12. However, the described embodiments should not be limited to the examples provided to limit the scope provided by the appended claims.

In one embodiment, a test plan may be generated for testing the various components, functions or features of a software application. As test scripts are generated for testing the various components, functions or features of a software application, a software test may be evaluated according to the embodiments described herein, such that a testing proficiency value is assigned or issued for each software test (see process block 360). Depending on the testing proficiency value issued for the various software tests, a QA team may be required to alter a testing plan due to the inadequate testing proficiency values. In an alternative embodiment, an event message report (see, process block 350) based on event message data 250 (see FIG. 5) may illustrate that the coverage provided by the incremental testing of the software application is insufficient.

Accordingly, in one embodiment, modification of a testing plan to broaden the test area provided by the various tests of a software application may be performed. Accordingly, in one embodiment, once sufficient testing proficiency values (see, process block 360) are received for each of the software tests of a software application, a QA team that identifies above-average testing proficiency values for each of the software tests and/or sufficient coverage of the collective software tests (see process block 350) may have sufficient assurance that QA of the application is satisfied to enable a first customer shipment.

Referring again to FIG. 6, at process block 310, a database is populated with event messages that may be issued by a software application in response to test conditions. A sample database is illustrated in FIGS. 1-3. At process block 320, a test (e.g., test scripts 292 shown in FIG. 3) of a software application is run. At process block 330, data is collected on event messages generated during a test of the software application to form event message data 250 within a database 210, for example, as illustrated in FIG. 2.

In one embodiment, at process block 350, the event message data 250 may be processed by testing proficiency module 200 to provide an event message report to illustrative the coverage of the various test scripts in testing the various layers of a software application code. Using such information, a QA team may be able to determine overlap between the various tests of components; or when a lack of overlap is detected, the QA team can further broaden the testing provided by such test scripts 292 to provide sufficient testing coverage of a software application to enable a first customer shipment.

At process block 360, a testing proficiency is estimated for the test of the software application according to the event message data. As described above, the estimate of the testing proficiency may include, but is not limited to, assigning or issuing a test proficiency value according to a testing percentage based on a count of event messages within an EMS database that match an event message issued by the software application divided by a total event message count, or other like value for judging how thoroughly a software test has tested software application code to enable a first customer shipment.

As described herein, such testing percentages are based on software application code information including, but not limited to a total event message count, event message types, an event message count per type of the software application, or the like. Accordingly, assuming above-average testing proficiency values or other like metric are determined from one or more test and sufficient breadth of the collective software test is established, testing of the software application or component may be completed with sufficient quality assurance of the software application for issuance of a first customer shipment of the software application code.

Figure 7:
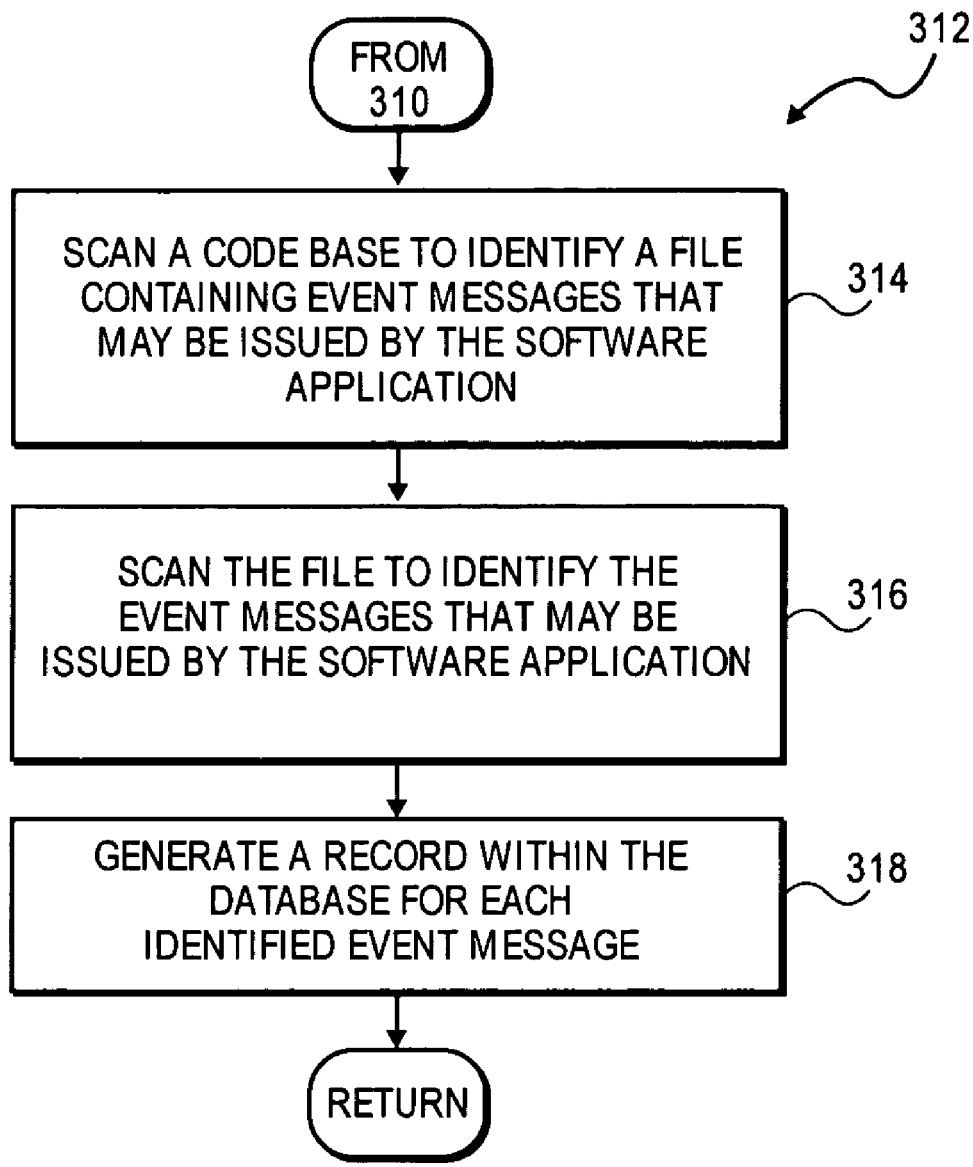
FIG. 7 is a flowchart illustrating a method for extracting EMS event messages from a code base and populating a database with the extracted EMS event messages, in accordance with one embodiment.

FIG. 7 is a flowchart illustrating a method 312 for populating an event message system (EMS) database using, for example, EMS extraction module 230, as shown in FIG. 3, in accordance with one embodiment. Representatively, at process block 314, a code base is scanned to identify a file containing event messages that may be issued by a software application. As described herein, the "code base" of a software application or computer program is the source code that implements the software application's functionality. Once detected, at process block 316, a record is generated within the database for each identified event message.

In one embodiment, the EMS event message file, as illustrated with reference to FIG. 4, includes an EMS ID field 222, a message body 224 and software component description 226. In the embodiments described, it is assumed that the software modules of a software application do not include identical event messages. Accordingly, in the embodiments described, the event messages for each module of the software application are unique. In an alternative embodiment, the software modules of the application may include matching event messages. Accordingly, in such embodiments, records within the EMS records 240 generated by EMS extraction module 230 are unique according to the combination of EMS ID field 222, message body field 224 and the system information field 226, as shown in FIG. 6.

Figure 8:
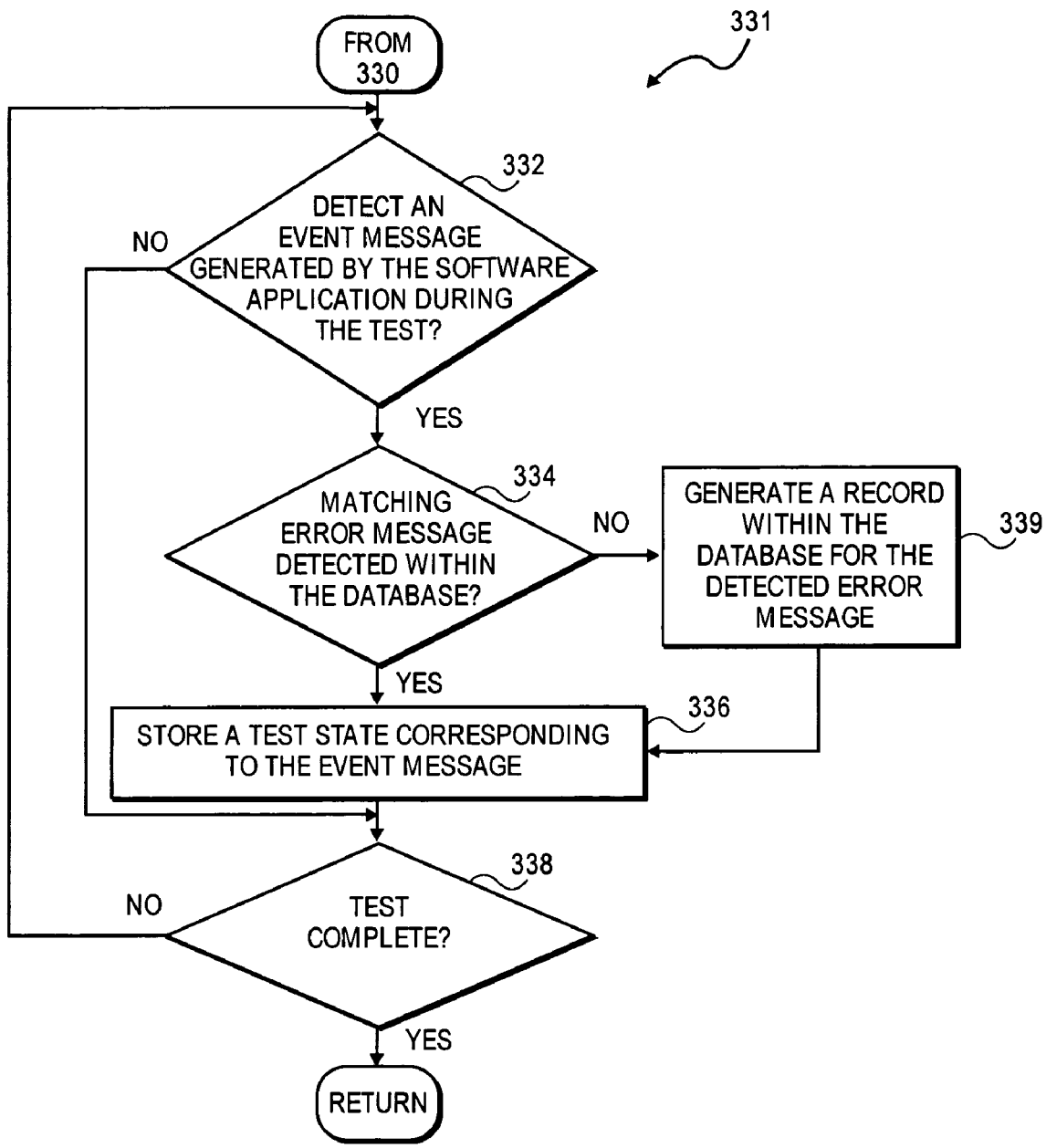
FIG. 8 is a flowchart illustrating a method for collecting data on event messages generated during a test of the software application, in accordance with one embodiment.

FIG. 8 is a flowchart illustrating a method 331 for collecting data on event messages generated during the test of the software application, in accordance with one embodiment, for example, as illustrated with reference to FIG. 2. At process block 332, it is determined whether an event message generated by the software application during the test is detected. Once detected, at process block 334, the EMS database is scanned to find a matching event message. If a matching event message is detected, at process block 336, a test state during the generation of the event message is stored. However, if a matching event within the database is not detected, at process block 339, a record is generated within the database for the detected event message.

Accordingly, in one embodiment, an event message file, for example, as shown in FIG. 3, may not include each event message that may be issued by a software application. Accordingly, at process block 339, the database is updated with a detected record. For example, as shown in FIG. 3, in one embodiment, EMS records 240 would be updated to generate an EMS event message record for the detected event message. Once generated, the test state would be stored to provide event message data 250. Finally, at process block 338, process blocks 332-339 are repeated until the software test is complete.

Figure 9:
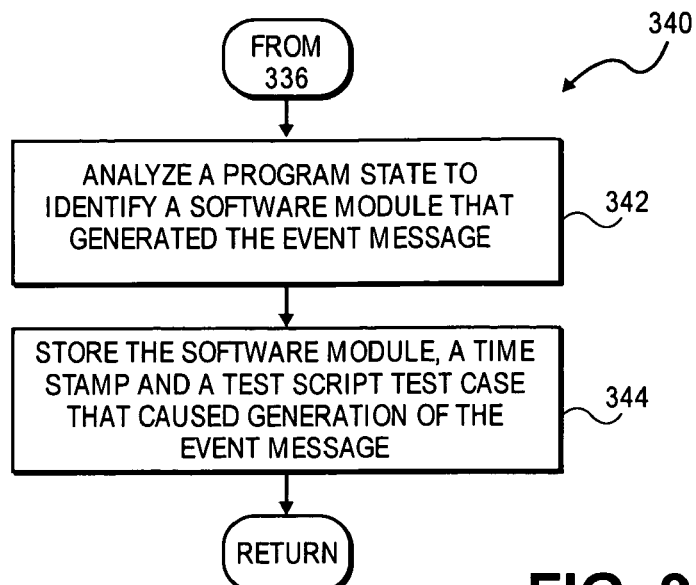
FIG. 9 is a flowchart illustrating a method for storing a test state during the generation of an event message, in accordance with one embodiment.

FIG. 9 is a flowchart illustrating a method 340 for recording a test state during generation of a detected event message, in accordance with one embodiment, for example, as described with reference to FIG. 3. At process block 342, a test state is analyzed to identify a software module that generated the event message. Once identified, at process block 342, the software module that generated the event message, a test script case that caused generation of the event message, and a time stamp are recorded to provide event message data 450, as shown, for example. In FIG. 5.

Figure 10:
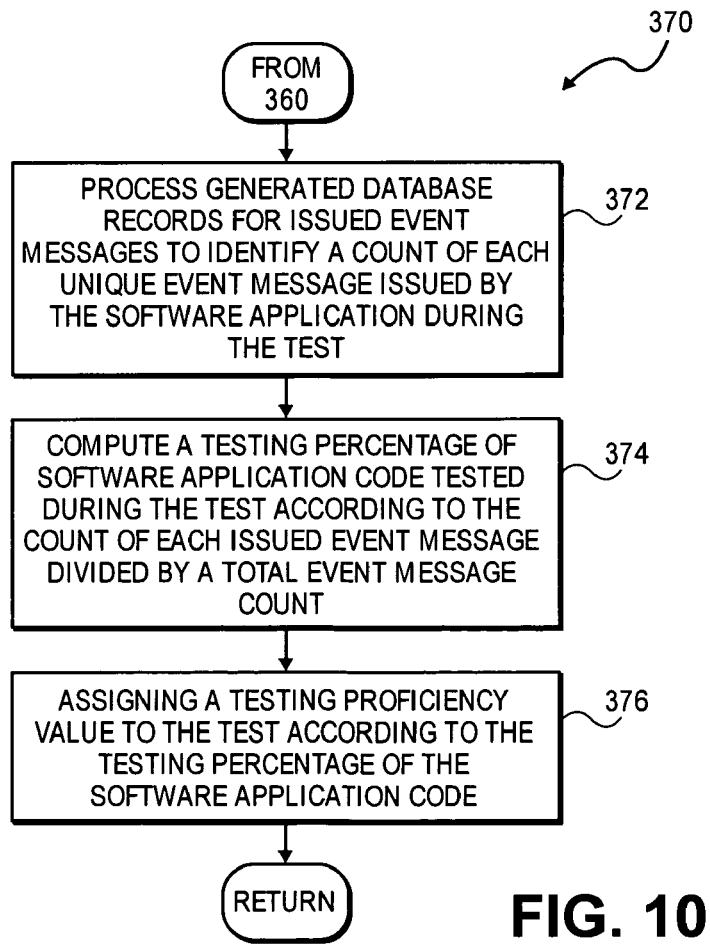
FIG. 10 is a flowchart illustrating a method for assigning a testing proficiency value to a test script according to event message data, in accordance with one embodiment.

FIG. 10 is a flowchart illustrating a method 370 for assigning a testing proficiency value to a software test according to a testing percentage computed from event message data and according to the one embodiment. At process block 372, records generated within a database are processed for issued event messages of a software application during a software application test. In one embodiment, the records are processed to identify a count of each event message issued by the software application during the test. Once determined, at process block 374, a testing percentage of software application code tested during the software tests is computed according to the count of each event message divided by total event message count, for example, as determined at process block 372.

As described herein, the testing percentage of software application code tested may include, for example, a percentage of issued event messages divided by a total event message count, a percentage of the event messages of an event message type issued by the software application divided by a total event message count of the event message type of the software application code or other like measurement for determining the testing percentage of software application code tested. At process block 376, a testing proficiency values is assigned to the software test according to the testing percentage of software application code.

In one embodiment, when the testing percentage may be converted into, for example, a letter based system or in alternative embodiments, combined into a numeric based system for determining how thoroughly a software test or test script has subjected a software application to error conditions. Accordingly, depending on the grading provided to the various test scripts for testing a software application, such as, for example, an operating system of a storage server, as shown in FIG. 11, such grading may be used to determine whether testing of the software application is complete. Accordingly, assuming above-average testing proficiency values or other like metric are determined from one or more test of the software application, testing of the software application or component may be completed with sufficient quality assurance of the software application for issuance of a first customer shipment of the software application code.

As noted above, the techniques for estimating the proficiency of a software test introduced herein can be implemented to test software application code within a storage server. FIG. 11 shows a simple example of a network environment 400 which incorporates apparatus 100, as shown in FIG. 1. Note that the technique can be adapted for use in other types of storage systems. For example, the technique can be adapted for use in storage systems, such as file servers that operate on behalf of one or more clients to store and manage shared files in a set of mass storage devices, such as magnetic or optical storage based disks or tapes, storage systems that provide clients with block-level access to stored data, storage systems that provide access to stored data, or the like. However, the techniques for estimating the proficiency of a software test introduced herein are not limited to use in storage servers and may be used to estimate the proficiency of any software application that generates a response to detected error conditions.

System Architecture

Storage server ("filer") 100 is coupled locally to a storage subsystem 440 which includes a set of mass storage devices, and to a set of clients 410 through a network 430, such as a local area network (LAN). Each of the clients 410 may be, for example, a conventional personal computer (PC), workstation, or the like. Storage subsystem 440 is managed by storage server 100. For example, storage server 100 receives and responds to various read and write requests from the clients 410, directed to data stored in or to be stored in storage subsystem 440. The mass storage devices in storage subsystem 440 may be, for example, conventional magnetic disks, optical disks such as component disks-read only memory (CD-ROM) or digital versatile/video disks (DVD) based storage, magneto-optical (MO) storage, or any other type of non-volatile storage devices suitable for storing large quantities of data.

Storage server 100 may have a distributed architecture; for example, it may include a separate N-("network") blade and D- (disk) blade (not shown). In such an embodiment, the N-blade is used to communicate with clients 410, while the D-blade includes the file system functionality and is used to communicate with the storage subsystem 440. The N-blade and D-blade communicate with each other using an internal protocol. Alternatively, storage server 100 may have an integrated architecture, where the network and data components are all contained in a single box. The storage server 100 further may be coupled through a switching fabric to other similar file servers (not shown) which have their own local storage subsystems. In this way, all of the storage subsystems can form a single storage pool, to which any client of any of the file servers has access.

FIG. 12 is a block diagram illustrating selected aspects of the logical architecture of a storage system (e.g., its operating system), according to one embodiment. In one embodiment, operating system 500 includes a collection of coupled processing modules to handle client requests (e.g., requests from clients 410, shown in FIG. 11). A request starts in the network access layer 530 at the lower left, and moves up through the network protocol layers 520 and the file system 510, eventually generating disk input/output (I/O) if necessary. When file system 510 finishes the request, it sends a reply back to the network. A system administration layer (not shown) monitors and controls the modules below. In addition to the modules shown in FIG. 12, a simple real-time kernel may provide basic services such as process creation, memory allocation, message passing, and interrupt handling. In an alternative embodiment, operating system 500 may include more modules, fewer modules, and/or different modules.

In one embodiment, operating system 500 includes a number of network drivers to process client requests. In the embodiments described, the network drivers (not shown) may include Ether-channel driver, Fiber Distributed Data Interface (FDDI) driver, Asynchronous Transfer Mode (ATM) driver, and gigabit Ethernet driver. In an alternative embodiment, operating system 500 may include more network drivers, fewer network drivers, and/or different network drivers.

Elements of embodiments of the present invention may also be provided as a machine-readable storage medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EEPROM), magnetic or optical cards, propagation media or other type of machine-readable media suitable for storing electronic instructions. Also, embodiments of the invention may be downloaded as a computer program which may be transferred from a remote computer (e.g. a server) to a requesting computer (e.g. a client) by way of data signals embodied in a carrier wave or other propagation medium via a communication link (e.g. a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
    populating a database with event messages from a code base of a software application the event messages capable of being issued by the software application, in response to input;
    collecting data on event messages generated during a test of the software application to form event message data including a number of event messages evoked by the test; wherein collecting data includes:
        (1) detecting an event message generated by the software application during the test,
        (2) scanning the database to find a matching event message,
        (3) storing a program state during the generation of the event message, and
        (4) repeating (1)-(3) for each event message generated during the test; wherein the test is a negative test, and
    assigning a testing proficiency value to the test based on the number of event messages evoked and a total number of event messages stored in the database.

2. The method of claim 1, wherein scanning the database further comprises:
    generating a database record to store an event message generated by the software application during the test if the generated event message does not equal within the database.

3. The method of claim 1, wherein storing the program state further comprises:
    analyzing the program state to identify a software module that generated the event message; and
    storing the software module, a time stamp and a test script test case that caused the generation of the event message.

4. The method of claim 1, wherein collecting data further comprises:
    generating a database record for each event message issued by the software application during the negative test; and
    processing generated database records for issued event messages to identify a count of each event message issued by the software application during the negative test.

5. The method of claim 1, wherein collecting data comprises:
    tracking each event message within the database that matches an event message generated during the test; and
    determining a count of each generated event message per event message type.

6. The method of claim 1, further comprising:
    computing a measurement of software application code tested during the negative test according to the event message data;
    determining a testing percentage of the test according to a count of each event message issued by the software application code divided by a total count of the event messages of the software application code;
    assigning a testing proficiency value to the test according to the testing percentage; and
    generating an event message report according to the event message data.

7. The method of claim 1, wherein prior to collecting data, the method further comprises:
    selecting a test script to subject the software application to error conditions during execution as the negative test; and
    executing the test script to perform the negative test.

8. The method of claim 1, wherein prior to collecting data, the method further comprises:
    scanning a code base to identify a file containing event messages that may be issued by the software application in response to error conditions; and
    generating a record within the database for each identified even message.

9. The method of claim 1, wherein a code base, including the code of the software application, and contains a file that lists event messages that may be issued by the software application in response to error conditions.

10. An article of manufacture comprising:
    a machine readable storage medium providing instructions that, when executed by an apparatus, cause the apparatus to:
    populate a database with event messages from a code base of a software application, the event messages capable of being issued by the software application;
    collect data on event messages generated during a test of the software application to form event message data including a number of event messages evoked by the test; wherein the instructions include instructions directed to data collection that cause the apparatus to:
        (1) detect an event message generated by the software application during the test,
        (2) scan the database to find a matching event message,
        (3) store a test state during the generation of the event message, and
        (4) repeat (1)-(3) for each event message generated during the test, and
    assign a testing proficiency of the test based on the number of event messages and a total number of event messages stored in the database.

11. The article of manufacture of claim 10, wherein the instructions that, when executed by the apparatus, cause the apparatus to scan the database further cause the apparatus to:

generate a database record to store an event message generated by the software application during the test if the generated event message does not exist within the database.

12. The article of manufacture of claim 10, wherein the instructions that, when executed by the apparatus, cause the apparatus to store the program state further cause the apparatus to:
analyze the program state to identify a software module that generated the event message; and
store the software module, a time stamp and a test script test case that caused the generation of the event message.

13. The article of manufacture of claim 10, wherein the instructions that, when executed by the apparatus, cause the apparatus to collect data further cause the apparatus to:
generate a database record for each event message issued by the software application during the test;
process generated database records for issued event messages to identify a count of each event message issued by the software application during the test;
determine a testing percentage of the test according to the count of each issued event message divided by a total number of event messages of the software application code;
assigning a testing proficiency value to the test according to the testing percentage; and
generating an event message report according to the event message data.

14. An apparatus, comprising:
a code base including software application code and an event message system (EMS) file including event messages that can be issued by the software application code in response to error conditions;
a database populated with each event message included in the EMS file;
a test library including at least one test to issue test conditions to the software application during execution of the software application, a message collection module and a testing percentage module; wherein the message collection module is further to generate a database record to store an event message generated by the software application during the test if the generated event message does not exist within the database; and
a processor coupled to the database, the processor including an execution unit to execute the software application code according to the test, and to load the message collection module to collect data on event messages generated during the test of the software application to form event message data including a number of event messages evoked by the test conditions within the database and to load the testing percentage module to assign a testing proficiency value to the test according to a measurement of software application code tested during the test according to the event message data based on a number of event messages evoked and a total number of event message stored in the database.

15. An apparatus of claim 14, wherein the message collection module is further to generate a database record for each event message issued by the software application during the test, and to process generated database records for issued event messages to identify a count of each event message issued by the software application during the test.

16. An apparatus of claim 14, wherein the testing percentage module is further to track a count of each event message within the database that matches an event message generated during the test and to estimate a testing proficiency of the test according to a percentage of the generated event message divided by a total count of the event messages of software application code.

17. An apparatus of claim 14, wherein the test library further comprises:
an EMS extraction module to scan the code base to identify the EMS file containing event messages that may be issued by the software application and populate the database with each identified event message.

* * * * *